United States Patent
Agarwal et al.

(10) Patent No.: US 10,243,845 B2
(45) Date of Patent: Mar. 26, 2019

(54) MIDDLEBOX TRACING IN SOFTWARE DEFINED NETWORKS

(71) Applicant: International Business Machines Corporation, Armonk, NY (US)

(72) Inventors: Kanak B. Agarwal, Austin, TX (US); Eric J. Rozner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 462 days.

(21) Appl. No.: 15/171,030

(22) Filed: Jun. 2, 2016

(65) Prior Publication Data

US 2017/0353373 A1 Dec. 7, 2017

(51) Int. Cl.
*H04L 12/24* (2006.01)
*H04L 12/721* (2013.01)
*H04L 29/06* (2006.01)
*H04L 12/26* (2006.01)

(52) U.S. Cl.
CPC .............. *H04L 45/38* (2013.01); *H04L 41/12* (2013.01); *H04L 43/50* (2013.01); *H04L 63/1408* (2013.01); *H04L 43/00* (2013.01)

(58) Field of Classification Search
CPC ...... H04L 41/12; H04L 43/00; H04L 63/1408
See application file for complete search history.

(56) References Cited

U.S. PATENT DOCUMENTS

| 9,104,492 | B2 | 8/2015 | Gember et al. | |
| 9,755,969 | B2 * | 9/2017 | Agarwal | H04L 41/12 |
| 2007/0286185 | A1 | 12/2007 | Eriksson | |
| 2013/0003735 | A1 | 1/2013 | Chao et al. | |
| 2013/0132533 | A1 | 5/2013 | Padmanabhan et al. | |
| 2013/0191628 | A1 * | 7/2013 | Nedeltchev | H04L 63/0272 713/153 |
| 2013/0227689 | A1 * | 8/2013 | Pietrowicz | G01R 1/20 726/23 |

(Continued)

FOREIGN PATENT DOCUMENTS

WO 2005062558 A1 7/2005

OTHER PUBLICATIONS

Abujoda et al; Invariant Preserving Middlebox Traversal, 2015.

(Continued)

*Primary Examiner* — Jeong S Park
(74) *Attorney, Agent, or Firm* — Garg Law Firm, PLLC; Rakesh Garg; Mercedes L. Hobson

(57) ABSTRACT

At an SDN controller executing using a processor and a memory, a tracing packet is configured with a default value in a tag field. The tracing packet is inserted from the SDN controller into the SDN at a switch in the SDN. A returned packet and a port identifier is received at the controller, from the switch, the returned packet including a modified content in a location of the tracing packet that is different from the tag field. The port identifier corresponds to a port of the switch on which the switch received the returned packet from an middlebox. A function of the middlebox is identified by analyzing a modification applied to the modified content by the middlebox. The function of the middlebox and a location of the middlebox in the SDN are saved. The location includes the port identifier and an identifier of the switch.

20 Claims, 6 Drawing Sheets

(56) References Cited

U.S. PATENT DOCUMENTS

| | | | |
|---|---|---|---|
| 2013/0332983 A1 | 12/2013 | Koorevaar et al. | |
| 2015/0124651 A1 | 5/2015 | Zhang et al. | |
| 2015/0180769 A1 | 6/2015 | Wang et al. | |
| 2015/0256397 A1* | 9/2015 | Agarwal | H04L 41/12 370/254 |
| 2016/0142269 A1* | 5/2016 | Konduru | H04L 43/026 709/224 |
| 2016/0269266 A1* | 9/2016 | Hooda | H04L 41/0853 |

OTHER PUBLICATIONS

Quazi et al; SIMPLE-fying Middlebox Policy Enforcement Using SDN, SIGCOMM'13, Aug. 12-16, 2013, Hong Kong, China.

Sherry et al; Making Middleboxes Someone Else's Problem: Network Processing as a Cloud Service, SIGCOMM'12, Aug. 13-17, 2012, Helsinki, Finland.

Gember et al. Toward Software-Defined Middlebox Networking, Hotnets '12, Oct. 29-30, 2012, Seattle, WA, USA.

Agarwal et al; SDN traceroute: Tracing SDN Forwarding without Changing Network Behavior, HotSDN'14, Aug. 22, 2014, Chicago, IL, US.

Detal et al; Revealing Middlebox Interference with Tracebox, IMC'13, Oct. 23-25, 2013, Barcelona, Spain.

Craven et al; A Middlebox-Cooperative TCP for a non End-to-End Internet, SIGCOMM'14, Aug. 17-22, 2014, Chicago, IL, USA.

Fayazbakhsh et al; Enforcing Network-Wide Policies in the Presence of Dynamic Middlebox Actions using FlowTags, Apr. 2-4, 2014, Seattle, WA, USA.

\* cited by examiner

MIDDLEBOX TRACING IN SOFTWARE DEFINED NETWORKS

TECHNICAL FIELD

The present invention relates generally to a method, system, and computer program product for locating and identifying the behaviors of components in a software defined network. More particularly, the present invention relates to a method, system, and computer program product for middlebox tracing in a software defined network.

BACKGROUND

A data processing environment comprises a variety of hardware, software, and firmware networking components. A physical network, also called a data plane or an underlay, is a network of physical components where an actual networking operations are performed and computational workloads are executed.

Techniques are available presently to construct a logical network, also known as a software defined network (SDN) overlay (hereinafter interchangeably, "SDN" or "overlay"), from such networking components. Essentially, networking components are abstracted into corresponding logical or virtual representations, and the abstractions are used to define the SDN. An SDN controller is a component that manages and operates the logical networking components within an SDN.

Hereinafter, any reference to a component within the context of an SDN is a reference to a logical representation of the component, which participates in the SDN. As an example, a reference to a switch in communication with an SDN controller is a reference to a logical representation of the switch—which can be a physical or a virtual switch—that operates in the SDN managed by the SDN controller.

A middlebox is a component used in an SDN to transform, inspect, filter, or otherwise manipulates data packets for purposes other than packet forwarding in the SDN. A switch used in an SDN is not a middlebox because the switch performs the packet forwarding function. A firewall used in the SDN is a middlebox because the firewall inspects packets to determine whether or not to allow the packet into or out of a data network. Some other non-exhaustive and non-limiting examples of middleboxes include proxies, intrusion detection systems (IDS), load balancers, network optimizers, address translation components, and many others.

A service chain is a sequence in which middleboxes are expected to operate on data traffic to enforce or implement a policy or rule. For example, a service chain (also interchangeably referred to herein as a policy chain), may include a firewall middlebox, followed by an IDS middlebox, followed by a proxy middlebox. When this example service chain is implemented correctly, the service chain implements an example policy according to which a data packet in the SDN is expected to be first processed by the firewall, then by the IDS, and then by the proxy before reaching a destination in the SDN.

SUMMARY

The illustrative embodiments provide a method, system, and computer program product. An embodiment includes a method that configures, at a software defined network (SDN) controller executing using a processor and a memory, a tracing packet with a default value in a tag field. The embodiment inserts the tracing packet from the SDN controller into the SDN at a switch in the SDN. The embodiment receives, at the controller, from the switch, a returned packet and a port identifier, the returned packet including a modified content in a location of the tracing packet that is different from the tag field, the port identifier corresponding to a port of the switch on which the switch received the returned packet from a middlebox. The embodiment identifies a function of the middlebox by analyzing a modification applied to the modified content by the middlebox. The embodiment saves the function of the middlebox and a location of the middlebox in the SDN, the location comprising the port identifier and an identifier of the switch.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
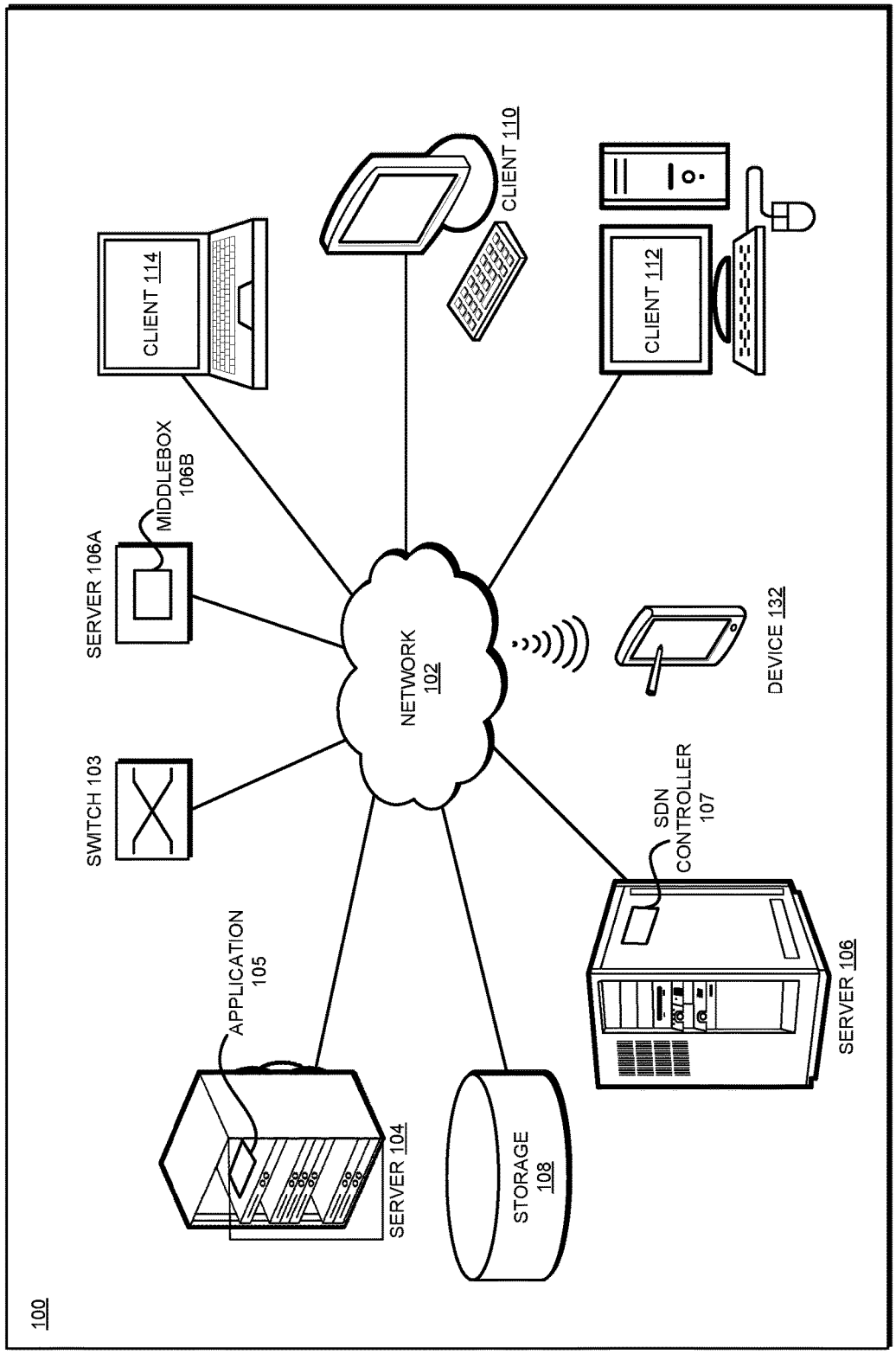
FIG. 1 depicts a block diagram of a network of data processing systems in which illustrative embodiments may be implemented.

A middlebox can be virtual or physical. For example, a firewall can be configured entirely in software as a virtual firewall. Many firewall software applications are presently available. The software firewall can be instantiated or executed, and the instance that executes on a machine participates in an SDN as a virtual firewall middlebox. A firewall may also be physical, i.e., a hardware device. Many hardware devices configured to perform a firewall function are presently available. The physical firewall operates in the underlay, and is reachable for firewall functions from the SDN overlay as a middlebox.

Other types of middleboxes can similarly have virtual or physical manifestations. The virtual and physical manifestations of such other middleboxes can similarly participate in an SDN. Thus, within the scope of the illustrative embodiments, a reference to a middlebox can be a reference to a virtual middlebox or a physical middlebox.

Generally, and without implying a limitation thereto, the various embodiments are described with respect to a "virtual middlebox" for middleboxes where an embodiment can modify the tag as described herein, and with respect to a "physical middlebox" for the middlebox where an embodiment cannot modify the tag. As an example, it may be possible to configure a physical middlebox to modify tag under certain circumstances. An embodiment can be adapted to use a physical middlebox with a tag modification operation as described herein.

Similarly, some embodiments described with respect to a virtual switch can be adapted for use with a physical switch that is programmable by an SDN controller. These and other such adaptations that will be apparent to those of ordinary skill in the art from this disclosure are contemplated within the scope of the illustrative embodiments.

The illustrative embodiments recognize that a large number of middleboxes can be operational in commercial data processing environments—such as a datacenter—at any given time. Some middleboxes may be deployed by a datacenter administrator, some may be configured by a tenant of the datacenter, some may be created or switched on on-the-fly as needed for limited amounts of time, and some may be moved from one location or host in the datacenter to another depending on the location of a need at a given time. Many other factors affect the operation of middleboxes in a data processing environment where an SDN is used.

Therefore, the illustrative embodiments recognize that managing middleboxes is a difficult problem. For example, knowing which middleboxes are operational, where they are attached or executing in the SDN, whether they are performing a function in a desired manner, and whether they are operating correctly in a service chain, are only some of the complex problems in such data processing environments.

Presently, the locations of physical middleboxes can be manually ascertained by someone physically observing the physical hardware. However, the illustrative embodiments recognize that ascertaining their proper operation in a service chain is still problematic and relies largely on manual effort. The illustrative embodiments also recognize that with virtual middleboxes, the problem includes not only ascertaining their proper operation in a service chain but also locating them as well.

The illustrative embodiments used to describe the invention generally address and solve the above-described problems and other problems related to managing middleboxes in an SDN.

An embodiment can be implemented as a software application. The application implementing an embodiment can be configured as a modification of an existing SDN controller, as a separate application that operates in conjunction with an existing SDN controller, a standalone application, or some combination thereof. An improved controller is an SDN controller that is improved with an embodiment described herein, in any manner described herein.

An embodiment operates with respect to virtual middleboxes. The embodiment adds, or causes an improved controller to add, a set of rules in one or more switches operating in the SDN. In an SDN network, the improved controller can install packet forwarding rules in a switch in the SDN.

Furthermore, the improved controller can set a priority for a packet forwarding rule that the controller installs in the switch. For example, the improved controller can make a packet forwarding rule the highest priority rule in the switch such that the switch executes that packet forwarding rule before other lower priority routing rules configured in the switch.

The switch uses the packet forwarding rule that has been added by an embodiment to route a trace packet. An embodiment inserts, or causes the improved controller to insert, a trace packet at a switch in the SDN. The embodiment configures the tracing packet such that the tracing packet can be processed by a switch as just another data packet in some data traffic flowing through the switch. The embodiment also sets a default or initial tag value in the tracing packet.

A trace packet is a packet configured to trace—or discover—a location, an operation, or both of a middlebox in the SDN. Particularly, a trace packet includes a tag field. In one embodiment, the tracing packet is constructed according to TCP specification, and includes one or more unused data fields therein. Generally, within the scope of the illustrative embodiments, the probe packet can be formed according to any suitable protocol, so long as a tag field can be constructed in a data communication according to the protocol, as described herein. For example, an embodiment described herein can be implemented according to UDP. For example, the tracing packet may include a header in which an unused data field may be repurposed for use as the tag field.

The tag field includes a tag value—or simply, a "tag". A tag is data having a value. The illustrative embodiments impose no limitation on the size or type of the tag field, or the tag values used therein except as follows—the tag field, however and wherever configured in a tracing packet, should be able to hold a sufficient number of unique tag values as may be needed according to an embodiment described herein to trace a number of middleboxes in a given implementation.

An embodiment modifies a configuration information, such as a configuration file, for instantiating virtual middleboxes in the SDN. The modification to the configuration includes adding a tag changing rule in a virtual middlebox that is instantiated from the modified configuration information. The tag changing rule causes the virtual middlebox to change the tag value in a trace packet when the virtual middlebox receives the trace packet.

Suppose that a number of virtual middleboxes are instantiated and connected to, coupled with, or reachable from a switch in which an embodiment installs a set of packet forwarding rules and inserts a trace packet. Each virtual middlebox is already programmed to modify a packet, including any trace packets, as a result of the function that the virtual middlebox is configured to provide in the SDN. For example, an address translation virtual middlebox may change a source address in the packet, a firewall virtual middlebox may change a destination address in the packet, and so on. In addition, due to the operation of a tag changing rule in the virtual middlebox, when a tracing packet reaches the virtual middlebox, the virtual middlebox also modifies the tag value in the trace packet.

Upon insertion of the tracing packet, the switch, using a flow entry that is unchanged by an embodiment determines where to send the tracing packet. Suppose that according to a service chain, the tracing packet reaches a virtual middlebox. The virtual middlebox performs two changes to the tracing packet to form a modified tracing packet—the virtual middlebox modifies the tracing packet according to the function of the virtual middlebox in the SDN, and the virtual middlebox modifies the tag value to a different tag value according to a tag changing rule configured in the virtual middlebox. The virtual middlebox sends the modified tracing packet back to the switch at the port where the virtual middlebox sends packets to the switch.

A highest priority packet forwarding rule configured by an embodiment in the switch detects the modified tracing packet. The packet forwarding rule is configured such that when the switch detects the modified tag value in the modified tracing packet, the switch forwards or routes the modified tracing packet to the improved controller.

The switch also sends a port information along with the modified tracing packet to the improved controller. Particularly, the port is the port identifier associated with the port on which the virtual middlebox sends packets to the switch, and where the switch received the modified tracing packet from the virtual middlebox. The switch can be configured to send the port information by further modifying the modified tracing packet, or via other methods, as may be suitable in a given implementation. As a non-limiting example, a switch that operates using the OpenFlow protocol can use a mechanism that is built-in according to the protocol to send port information with a packet to the controller.

An embodiment causes the improved controller to detect an incoming or returned modified tracing packet. The embodiment analyzes the modified tracing packet. The analysis reveals the SDN function that is configured in the virtual middlebox that performed the modifications on the modified tracing packet. The port information passed by the switch informs the embodiment of the location of the virtual middlebox, i.e., the embodiment determines that the virtual middlebox is located on that port of that switch (e.g., port x of switch y) in the SDN.

The embodiment has thus determined a location of the virtual middlebox and the function of the virtual middlebox in the SDN. The embodiment saves the location and the function information about the virtual middlebox.

An embodiment further causes the improved controller to reset the tag value to the default or initial value in the modified tracing packet. The improved controller keeps all the contents of the modified tracing packet intact, and simple resets the tag value, thus forming a changed modified tracing packet. The embodiment causes the improved controller to reinsert the changed modified tracing packet at the switch.

Because the routing of the tracing packet is performed in a manner similar to any other packet traffic at the switch, the switch forwards the changed modified tracing packet to the next virtual middlebox in the service chain just as the switch would another type of packet—had the other packet arrived at the switch, been sent to the first virtual middlebox, been returned from the first virtual middlebox, and was ready for the next virtual middlebox in the service chain.

The next virtual middlebox modifies the changed modified tracing packet according to the function of that virtual middlebox, modifies the tag value according to a tag changing rule configured therein by an embodiment, and sends the modified changed modified tracing packet (also referred to herein as the second modified tracing packet) back to the switch at the port where that virtual middlebox sends packets to the switch.

The switch, using the highest priority packet forwarding rule, forwards the second modified tracing packet to the improved controller. The improved controller analyzes the modifications made by the next virtual middlebox to identify the function of the next virtual middlebox, saves the location switch-port information and the function information of the next virtual middlebox, resets the tag in the second modified tracing packet, and reinserts the changed second modified tracing packet at the switch.

This process continues for any number of virtual middleboxes that may be located on the switch or on another switch in the SDN. If a virtual middlebox is located on another switch, the switch forwards the inserted tracing packet (whether initial tracing packet, changed modified tracing packet, or changed second modified tracing packet, and so on as the case may be, collectively referred to herein as a forwarded tracing packet), to the other switch. The other switch uses an unmodified flow entry to send the forwarded tracing packet to another virtual middlebox. The other virtual middlebox also modifies the forwarded tracing packet contents, modifies the tag using a tag changing rule, and returns the modified forwarded tracing packet to the switch at the virtual middlebox's port. The other switch then follows a similar process as described with respect to the previous switch, using the packet forwarding rules configured at the other switch.

Because the routing of the tracing packet is performed in a manner similar to any other packet traffic at the switch, the tracing packets inserted at the switch can be configured to reach, or test, any function in a given service chain, and the switch will route the tracing packet to the virtual middlebox that is performing that function wherever that virtual middlebox might be located. The embodiment thus determines the locations and functions of any number of virtual middleboxes in the SDN.

An embodiment operates with respect to physical middleboxes where tag modification by middlebox is not available. As described herein, the embodiment adds, or causes an improved controller to add, a set of highest priority packet forwarding rules in one or more switches operating in the SDN. An embodiment inserts, or causes the improved controller to insert, a trace packet at a switch in the SDN. The embodiment configures the tracing packet such that the tracing packet can be processed by a switch as just another data packet in some data traffic flowing through the switch. The embodiment also sets a default or initial tag value in the tracing packet.

Suppose that a number of physical middleboxes are connected to, coupled with, or reachable from a switch in which an embodiment installs a set of packet forwarding rules and inserts a trace packet. In a manner similar to the virtual middleboxes, each physical middlebox is also already configured to modify a packet, including any trace packets, as a result of the function that the physical middlebox is configured to provide in the SDN. Assume, as different from a virtual middlebox, a tag changing rule cannot be installed or configured in a physical middlebox. In other words, a physical middlebox is only configured to provide a designated pre-configured function in the SDN and cannot modify any tags in any tracing packets. The physical middlebox processes a tracing packet just as the physical middlebox would process another non-tracing packet in the SDN.

The switch, using a flow entry that is unchanged by an embodiment determines where to send the tracing packet. Suppose that according to a service chain, the tracing packet reaches a physical middlebox. The physical middlebox modifies the tracing packet according to the function of the physical middlebox in the SDN, and sends the modified tracing packet back to the switch at the port where the physical middlebox sends packets to the switch. The tag in the modified tracing packet remains unchanged from the tracing packet received by the physical middlebox.

A highest priority packet forwarding rule configured by an embodiment in the switch detects the modified tracing packet. The packet forwarding rule is configured such that when the switch detects any packet having a tag value configured therein being returned by the physical middlebox, the switch forwards or routes the modified tracing packet to the improved controller.

The switch also sends a port information along with the modified tracing packet to the improved controller. As with the virtual middleboxes, the port is the port identifier associated with the port on which the physical middlebox sends packets to the switch, and where the switch received the modified tracing packet from the physical middlebox. Again, the switch can be configured to send the port information by further modifying the modified tracing packet, or via other methods, as may be suitable in a given implementation.

An embodiment causes the improved controller to detect an incoming or returned modified tracing packet. The embodiment analyzes the modified tracing packet. The analysis reveals the SDN function that is configured in the physical middlebox that performed the modifications on the modified tracing packet. The port information passed by the switch informs the embodiment of the location of the physical middlebox, i.e., the embodiment determines that the virtual middlebox is located on that port of that switch (e.g., port x of switch y) in the SDN.

An embodiment further causes the improved controller to change the tag value in the modified tracing packet. The improved controller keeps all the contents of the modified tracing packet intact, and simple changes the tag value to a new tag value, thus forming a changed modified tracing packet. The embodiment causes the improved controller to reinsert the changed modified tracing packet at the switch.

Because the routing of the tracing packet is performed in a manner similar to any other packet traffic at the switch, the switch forwards the changed modified tracing packet to the next physical middlebox in the service chain just as the switch would another type of packet—had the other packet arrived at the switch, been sent to the first physical middlebox, been returned from the first physical middlebox, and was ready for the next physical middlebox in the service chain.

The next physical middlebox modifies the changed modified tracing packet according to the function of that physical middlebox, and sends the modified changed modified tracing packet (also referred to herein as the second modified tracing packet) back to the switch at the port where that physical middlebox sends packets to the switch. The tag in the second modified tracing packet remains unchanged from the changed modified tracing packet received by the physical middlebox.

The switch, using another highest priority packet forwarding rule, forwards the second modified tracing packet to the improved controller. The improved controller analyzes the modifications made by the next physical middlebox to identify the function of the next physical middlebox, saves the location switch-port information and the function information of the next physical middlebox, changes the tag in the second modified tracing packet to yet another new value to form a changed second modified tracing packet, and reinserts the changed second modified tracing packet at the switch.

This process continues for any number of physical middleboxes that may be located on the switch or on another switch in the SDN. If a physical middlebox is located on another switch, the switch forwards the inserted tracing packet (whether initial tracing packet, changed modified tracing packet, or changed second modified tracing packet, and so on as the case may be, collectively referred to herein as a forwarded tracing packet), to the other switch. The other switch uses a highest priority packet forwarding rule configured therein to forward the forwarded tracing packet to the improved controller.

The improved controller detects that that tracing packet was inserted at another switch and has returned to the improved controller unchanged via another switch. An embodiment causes the improved controller to reset the tag value to the default or initial value, while maintaining the contents of the returned forwarded tracing packet, and inserts the returned forwarded tracing packet as a new tracing packet at the other switch. The other switch then follows a similar process as described with respect to the previous switch, using the packet forwarding rules configured at the other switch.

Because the routing of the tracing packet is performed in a manner similar to any other packet traffic at the switch, the tracing packets inserted at the switch can be configured to reach, or test, any function in a given service chain, and the switch will route the tracing packet to the physical middlebox that is performing that function wherever that physical middlebox might be located. The embodiment thus determines the locations and functions of any number of physical middleboxes in the SDN.

A method of an embodiment described herein, when implemented to execute on a device or data processing system, comprises substantial advancement of the functionality of that device or data processing system in detecting locations and functions of middleboxes in an SDN. For example, presently available methods for determining a location and function of a middlebox requires manual inspection of the middlebox. An embodiment provides a method for using an improved SDN controller which can configure a switch in the SDN such that trace packets can be routed and manipulated by the middleboxes in a manner that reveals their locations and functions to the improved controller. This manner of middlebox tracing in an SDN is unavailable in the presently available methods. Thus, a substantial advancement of such devices or data processing systems by executing a method of an embodiment is in efficient, automated and dynamic detection of virtual middleboxes and physical middleboxes in an SDN regardless of where in the SDN they exist, for how long they exist, and how or when they are moved or terminated.

The illustrative embodiments are described with respect to certain types of networks, controllers, switches, middleboxes, packet forwarding rules, tag changing rules, configurations, functions, locations, tags, packets, packet manipulations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
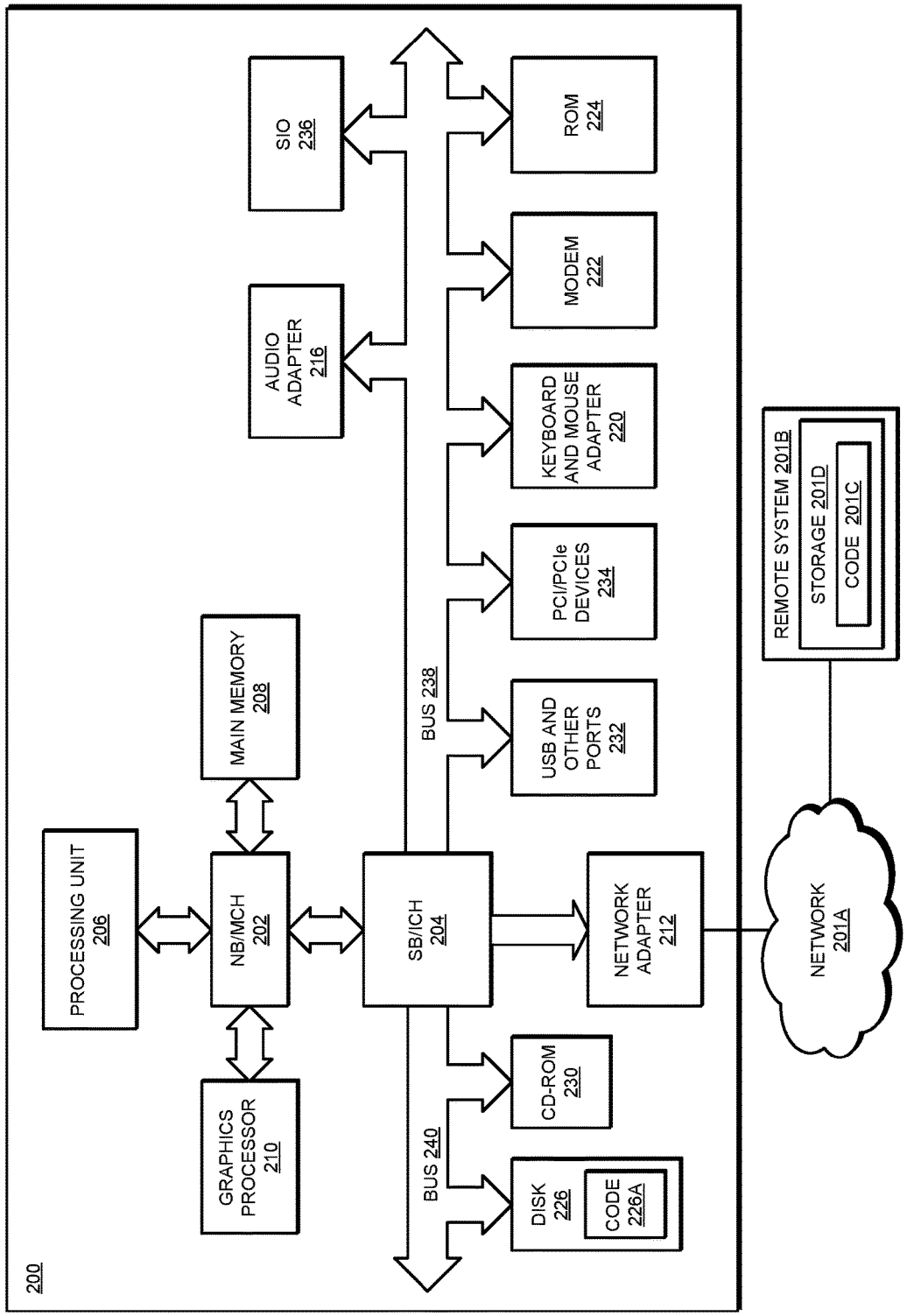
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. SDN controller 107 is an existing SDN controller. The combination of application 105 and SDN controller 107 forms an improved controller as described herein. Application 105 and SDN controller 107 may, but need not execute on the same machine. Switch 103 is a networking device used for forwarding data packets in network 102. Switch 103 and network 102 comprise an underlay. A virtual manifestation of switch 103 forms a virtual switch (not shown), which can be configured by the improved controller to operate in an SDN (not shown) in a manner described herein. Any number of virtual switches constructed from any number of switches 103 can operate in the SDN. Server 106A is any suitable data processing system in which middlebox 107B can be implemented. For example, server 106A can be a computer on which middlebox 106B may be instantiated and executed as a virtual middlebox. Any number of virtual middleboxes can be instantiated on server 106A. As another example, server 106A may be hardware that is configured to implement the function of middlebox 106B, server 106A and middlebox 106B together forming a physical middlebox. Any number of such virtual middleboxes or physical middleboxes can be constructed and operated in the SDN.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
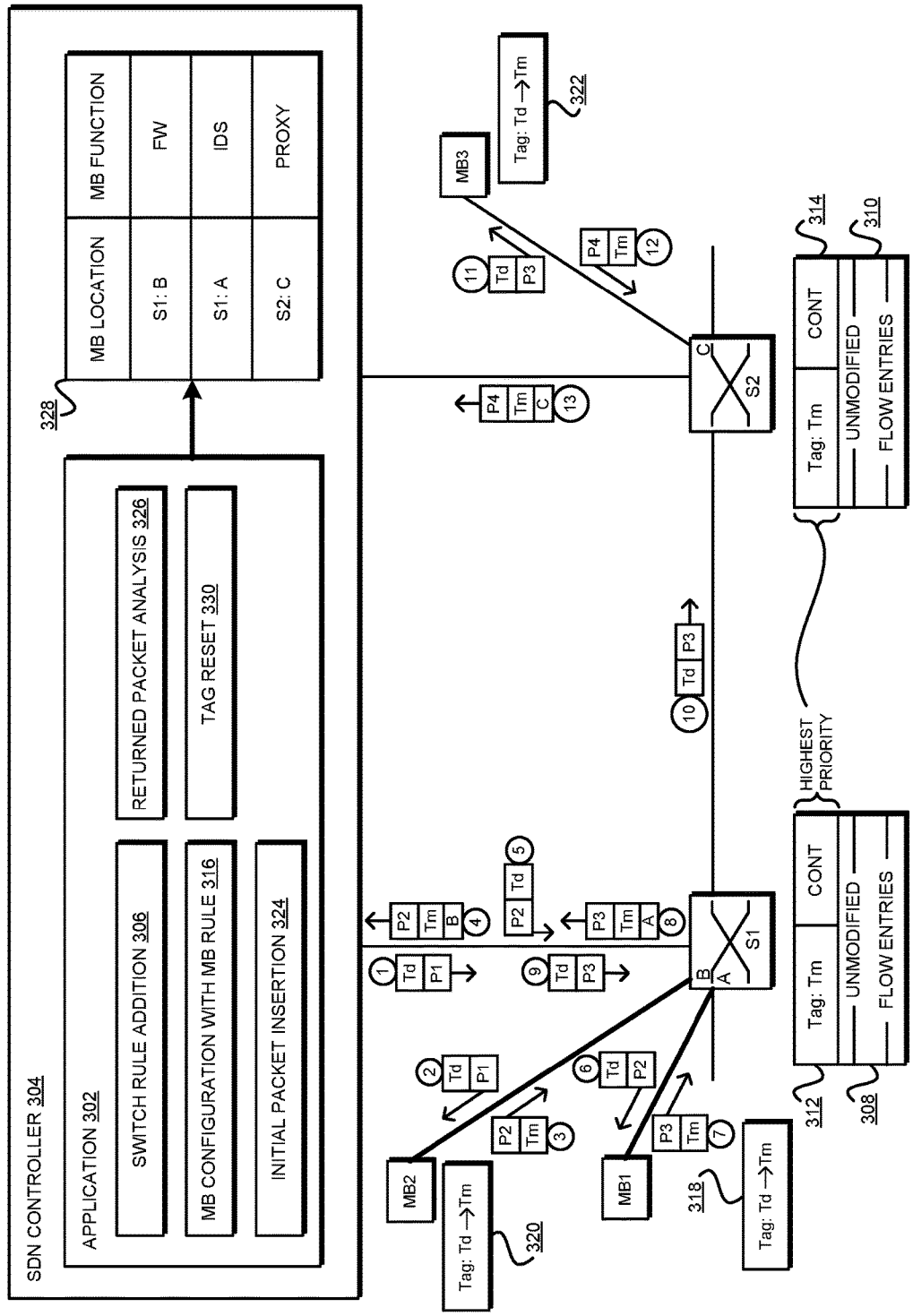
FIG. 3 depicts a block diagram of an example configuration for middlebox tracing in an SDN in accordance with an illustrative embodiment.

With reference to FIG. 3, this figure depicts a block diagram of an example configuration for middlebox tracing in an SDN in accordance with an illustrative embodiment. Application 302 is an example of application 105 in FIG. 1. SDN controller 304 is an example of SDN controller 107 in FIG. 1. Together, application 302 and SDN controller 304 form an improved controller as described herein.

Application 302 is depicted inside SDN controller 304 only to illustrate that application 302 affects the operation of SDN controller, and not to imply any locational limitation that SDN controller 304 and application 302 must execute of a single machine, or that application 302 must be implemented within SDN controller 304. Application 302 can be envisioned adjacent to SDN controller 304 in FIG. 3.

The middleboxes depicted in this figure are virtual middleboxes. A tracing packet at any stage in the depicted process is denoted as P with a numeral, such as P1, P2, P3, and P4. Different numerals are used to convey the meaning that a content other than a tag in those tracing packets are different. Td denotes an initial or default tag value. Tm denotes a modified tag value. For convenience and clarity, all virtual middleboxes are shown to change Td to Tm. Tm values can be different for different virtual middleboxes, i.e., different virtual middleboxes can change Td to different Tm values.

Component 306 adds a set of packet forwarding rules to a switch. For example, switch S1 has a routing table or an equivalent structure 308 that includes a set of unmodified flow entries; and switch S2, which is another switch, has a routing table or an equivalent structure 310 that includes a set of unmodified flow entries. Component 306 installs packet forwarding rule 312 in S1 and packet forwarding rule 314 in S2. Component 306 sets the execution priority of packet forwarding rule 312 and 314 to the highest priority level in their respective switches. Each of packet forwarding rule 312 and 314 is configured in their respective switches to detect the presence of Tm value in the tag field of a modified tracing packet received from a virtual middlebox, and forward the modified tracing packet to the improved controller.

Component 316 adds a set of tag changing rules to a virtual middlebox. For example, component 316 installs tag changing rule 318 in virtual middlebox MB1, which communicates with S1 on port A of S1, component 316 installs tag changing rule 320 in virtual middlebox MB2, which communicates with S1 on port B of S1, and component 316 installs tag changing rule 322 in virtual middlebox MB3, which communicates with S2 on port C of S2. Each of tag changing rule 318, 320, and 322 is configured to detect tag value Td in a packet received at their respective virtual middlebox, and when a tracing packet with the Td tag value is detected at a virtual middlebox, the tag changing rule of that virtual middlebox changes the tag value to Tm.

In an example operation, at step 1, component 324 inserts a tracing packet (P1) with a tag value of Td at S1 (P1-Tracing packet). At step 2, using an unmodified flow entry, S1 forwards P1-Td to MB2, perhaps because in a service chain, MB2 is supposed to receive the packets first.

At step 3, using tag changing rule 320, MB2 changes Td to Tm, changes the contents of P1 to form P2 (P2-Tm), and sends P2-Tm to S1 at port B. At step 4, using packet forwarding rule 312, S1 detects Tm in P2-Tm, and forwards P2-Tm to the improved controller. In step 4, S1 also informs the improved controller that P2-Tm was received on port B.

Component 326 analyzes the contents of P2 to identify a function performed by MB2. Component 326 records in data structure 328 the location of the virtual middlebox that returned P2-Tm, to wit, S1:B, and a function of the virtual middlebox as determined from the analysis of packet header changes in P2.

Component 330 resets the tag value of P2 to Td. In step 5, the improved controller reinserts P2-Td at S1 with input port B to continue packet forwarding. In step 6, using an unmodified flow entry, S1 forwards P2-Td to MB1, perhaps because in a service chain, MB1 is supposed to receive the packets next.

At step 7, using tag changing rule 318, MB1 changes Td to Tm, changes the contents of P2 to form P3 (P3-Tm), and sends P3-Tm to S1 at port A. At step 8, using packet forwarding rule 312, S1 detects Tm in P3-Tm, and forwards P3-Tm to the improved controller. In step 8, S1 also informs the improved controller that P3-Tm was received on port A.

Component 326 analyzes the contents of P3 to identify a function performed by MB1. Component 326 records in data structure 328 the location of the virtual middlebox that returned P3-Tm, to wit, S1:A, and a function of the virtual middlebox as determined from the analysis of packet header changes in P3.

Component 330 resets the tag value of P3 to Td. In step 9, the improved controller reinserts P3-Td at S1. In step 10, using an unmodified flow entry, S1 forwards P3-Td to S2, perhaps because in a service chain, a virtual middlebox that is supposed to receive the packets next is not reachable from S1 and a flow entry in S1 directs S1 to forward to S2 to find a path to that next virtual middlebox.

At step 11, S2 receives P3-Td and using an unmodified flow entry, S2 forwards P3-Td to MB3. At step 12, using tag changing rule 322, MB3 changes Td to Tm, changes the contents of P3 to form P4 (P4-Tm), and sends P4-Tm to S2 at port C. At step 13, using packet forwarding rule 314, S2 detects Tm in P4-Tm, and forwards P4-Tm to the improved controller. In step 13, S2 also informs the improved controller that P4-Tm was received on port C.

Component 326 analyzes the contents of P4 to identify a function performed by MB3. Component 326 records in data structure 328 the location of the virtual middlebox that returned P4-Tm, to wit, S2:C, and a function of the virtual middlebox as determined from the analysis of packet header changes in P4.

If an example service chain were formed as follows—firewall-IDS-Proxy—then the above example operation will have located all the virtual middleboxes participating in that service chain, and also determined whether the functions of the firewall, the IDS, and the proxy were performed at those respective virtual middleboxes. The analysis performed by component 326 can be as detailed and as specific to identify not only the type of the function, but also an accuracy, timeliness, and many other factors associated with various middlebox functions. Using the steps described with respect to FIG. 3, any number of virtual middleboxes can similarly be located and analyzed anywhere in a given SDN.

Figure 4:
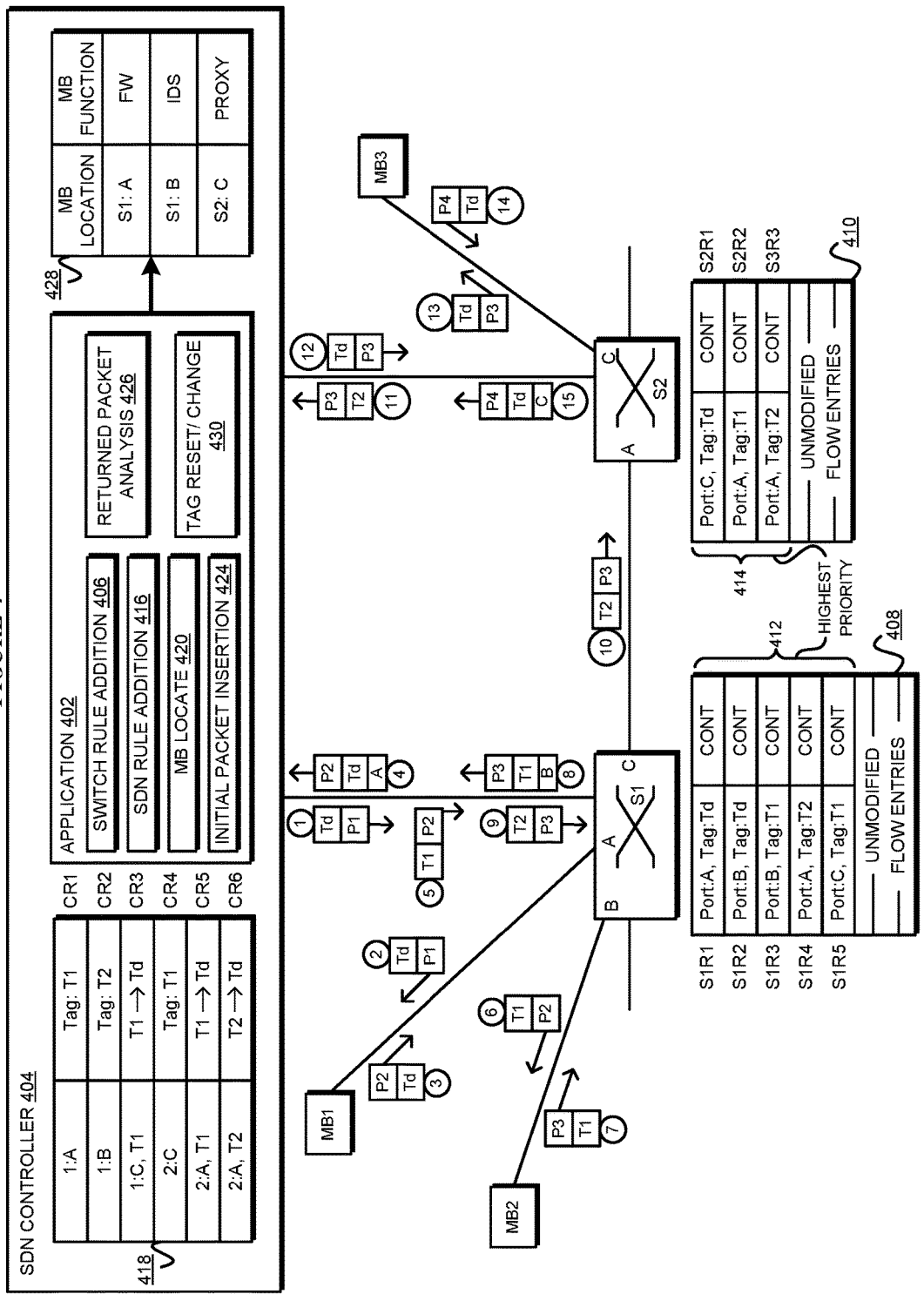
FIG. 4 depicts a block diagram of an example configuration for middlebox tracing in an SDN in accordance with an illustrative embodiment.

With reference to FIG. 4, this figure depicts a block diagram of an example configuration for middlebox tracing in an SDN in accordance with an illustrative embodiment. Application 402 is an example of application 105 in FIG. 1 or 302 in FIG. 3. SDN controller 404 is an example of SDN controller 107 in FIG. 1 or SDN controller 304 in FIG. 3. Together, application 402 and SDN controller 404 form an improved controller as described herein.

Application 402 is depicted inside SDN controller 404 only to illustrate that application 402 affects the operation of SDN controller, and not to imply any locational limitation that SDN controller 404 and application 402 must execute of a single machine, or that application 402 must be implemented within SDN controller 404. Application 402 can be envisioned adjacent to SDN controller 404 in FIG. 4.

The middleboxes depicted in this figure are physical middleboxes. A tracing packet at any stage in the depicted process is denoted as P with a numeral, such as P1, P2, P3, and P4. Different numerals are used to convey the meaning that a content other than a tag in those tracing packets are different. Td denotes an initial or default tag value. T1, T2, etc. denote different modified tag values.

Component 406 adds a set of packet forwarding rules to a switch. For example, switch S1 may be the same as or different from S1 in FIG. 3, has a routing table or an equivalent structure 408 that includes a set of unmodified flow entries; and switch S2, which is another switch and may be the same as or different from S2 in FIG. 3, has a routing table or an equivalent structure 410 that includes a set of unmodified flow entries. Component 406 installs packet forwarding rules 412 in S1 and packet forwarding rules 414 in S2. Component 306 sets the execution priority of packet forwarding rule 412 and 414 to the highest priority level in their respective switches.

In set 412, packet forwarding rule S1R1 (packet forwarding rule 1 in switch 1) is configured to determine whether a packet received on port A has a tag value Td, and if so, forward the packet to the improved controller. Similarly, in set 412, packet forwarding rule S1R2 (packet forwarding rule 2 in switch 1) is configured to determine whether a packet received on port B has a tag value Td, and if so, forward the packet to the improved controller. Similarly, in set 412, packet forwarding rule S1R3 (packet forwarding rule 3 in switch 1) is configured to determine whether a packet received on port B has a tag value T1, and if so, forward the packet to the improved controller. Similarly, in set 412, packet forwarding rule S1R4 (packet forwarding rule 4 in switch 1) is configured to determine whether a packet received on port A has a tag value T2, and if so, forward the packet to the improved controller. Similarly, in set 412, packet forwarding rule S1R5 (packet forwarding rule 5 in switch 1) is configured to determine whether a packet received on port C has a tag value T1, and if so, forward the packet to the improved controller.

In set 414, packet forwarding rule S2R1 (packet forwarding rule 1 in switch 2) is configured to determine whether a packet received on port C has a tag value Td, and if so, forward the packet to the improved controller. Similarly, in set 414, packet forwarding rule S4R2 (packet forwarding rule 2 in switch 4) is configured to determine whether a packet received on port A has a tag value T1, and if so, forward the packet to the improved controller. Similarly, in set 414, packet forwarding rule S2R3 (packet forwarding rule 3 in switch 2) is configured to determine whether a packet received on port A has a tag value T2, and if so, forward the packet to the improved controller.

Any number of packet forwarding rules can be similarly configured at any number of switches for any number of physical middleboxes. Essentially, set 412 configures S1 such that if any packet is received with Td on any port other than the port on which S1 communicates with the controller, S1 forwards the packet to the controller; and For each switch with n physical middleboxes at port pi (i=1 to n)
1) component 406 assigns a tag Ti (i=1 to n) to each middlebox on the switch and
2) Configures the switch to forward the tagged trace packets coming from the middleboxes to the controller (input port:$p_i$ tag:$T_d$)→send to controller i=(1 to n)

(input port:$p_i$ tag:$T_j$)→send to controller i,j=(1 to n) and j≠i

Component 416 adds set of rules 418 to be used at the improved controller. In set 418, rule CR1 (rule 1 in controller) is configured to set the tag value to T1 when a modified tracing packet is received on port A of S1 before reinserting the changed modified tracing packet. Similarly, in set 418, rule CR2 (rule 2 in controller) is configured to set the tag value to T2 when a modified tracing packet is received on port B of S1 before reinserting the changed modified tracing packet. Similarly, in set 418, rule CR3 (rule 2 in controller) is configured to reset the tag value to Td when a modified tracing packet is received on port C of S1 with tag value of T1. Similarly, in set 418, rule CR4 (rule 4 in controller) is configured to set the tag value to T1 when a modified tracing packet is received on port C of S2 before reinserting the changed modified tracing packet. Similarly, in set 418, rule CR5 (rule 2 in controller) is configured to reset the tag value to Td when a modified tracing packet is received on port A of S2 with tag value of T1. Similarly, in set 418, rule CR6 (rule 2 in controller) is configured to reset the tag value to Td when a modified tracing packet is received on port A of S2 with tag value of T2.

Component 420 may prepopulate structure 428 with the locations of physical middleboxes, if known. The operations and port associations of the physical middleboxes with the switches are populated in structure 428 as follows In an example operation, at step 1, component 424 inserts a tracing packet (P1) with a tag value of Td at S1 (P1-Td). At step 2, using an unmodified flow entry, S1 forwards P1-Td to MB1, perhaps because in a service chain, MB1 is supposed to receive the packets first.

At step 3, MB1 changes the contents of P1 to form P2 (P2-Td), leaves Td unchanged, and sends P2-Td to S1 at port A. At step 4, using packet forwarding rule S1R1, S1 detects Td in P2-Td, and forwards P2-Td to the improved controller. In step 4, S1 also informs the improved controller that P2-Td was received on port A.

Component 426 analyzes the contents of P2 to identify a function performed by MB1. Component 426 records in data structure 428 the location of the physical middlebox that returned P2-Td, to wit, S1:A, and a function of the physical middlebox as determined from the analysis of P2.

Component 430 changes the tag value of P2 to T1 according to CR1. In step 5, the improved controller reinserts P2-T1 at S1. In step 6, using an unmodified flow entry, S1 forwards P2-T1 to MB2, perhaps because in a service chain, MB2 is supposed to receive the packets next.

At step 7, MB2 changes the contents of P2 to form P3 (P3-T1), leaves T1 unchanged, and sends P3-T1 to S1 at port B. At step 8, using packet forwarding rule S1R3, S1 detects T1 in P3-T1, and forwards P3-T1 to the improved controller. In step 8, S1 also informs the improved controller that P3-T1 was received on port B.

Component 426 analyzes the contents of P3 to identify a function performed by MB2. Component 426 records in data structure 428 the location of the physical middlebox that returned P3-T1, to wit, S1:B, and a function of the physical middlebox as determined from the analysis of P3.

Component 430 changes the tag value of P3 to T2 according to CR2. In step 9, the improved controller reinserts P3-T2 at S1. In step 10, using an unmodified flow entry, S1 forwards P3-T2 to S2, perhaps because in a service chain, a physical middlebox that is supposed to receive the packets next is not reachable from S1 and a flow entry in S1 directs S1 to forward to S2 to find a path to that next physical middlebox.

At step 11, S2 receives P3-T2 on port A of S2. Using S2R3, S2 forwards P3-T2 to the controller. Component 430 resets T2 to Td using CR6 and reinserts P3-Td at S2 in step 12.

At step 13, using an unmodified flow entry, S2 forwards P3-Td to MB3. In step 14, MB3 changes the contents of P3 to form P4 (P4-Td), leaves Td unchanged, and sends P4-Td to S2 at port C. At step 15, using S2R1, S2 detects Td in P4-Td, and forwards P4-Td to the improved controller. In step 15, S2 also informs the improved controller that P4-Td was received on port C.

Component 426 analyzes the contents of P4 to identify a function performed by MB3. Component 426 records in data structure 428 the location of the physical middlebox that returned P4-Td, to wit, S2:C, and a function of the physical middlebox as determined from the analysis of P4.

If an example service chain were formed as follows—firewall-IDS-Proxy—then the above example operation will have located all the physical middleboxes participating in that service chain, and also determined whether the functions of the firewall, the IDS, and the proxy were performed at those respective physical middleboxes. The analysis performed by component 426 can be as detailed and as specific to identify not only the type of the function, but also an accuracy, timeliness, and many other factors associated with various middlebox functions. Using the steps described with respect to FIG. 4, any number of physical middleboxes can similarly be located and analyzed anywhere in a given SDN.

Figure 5:
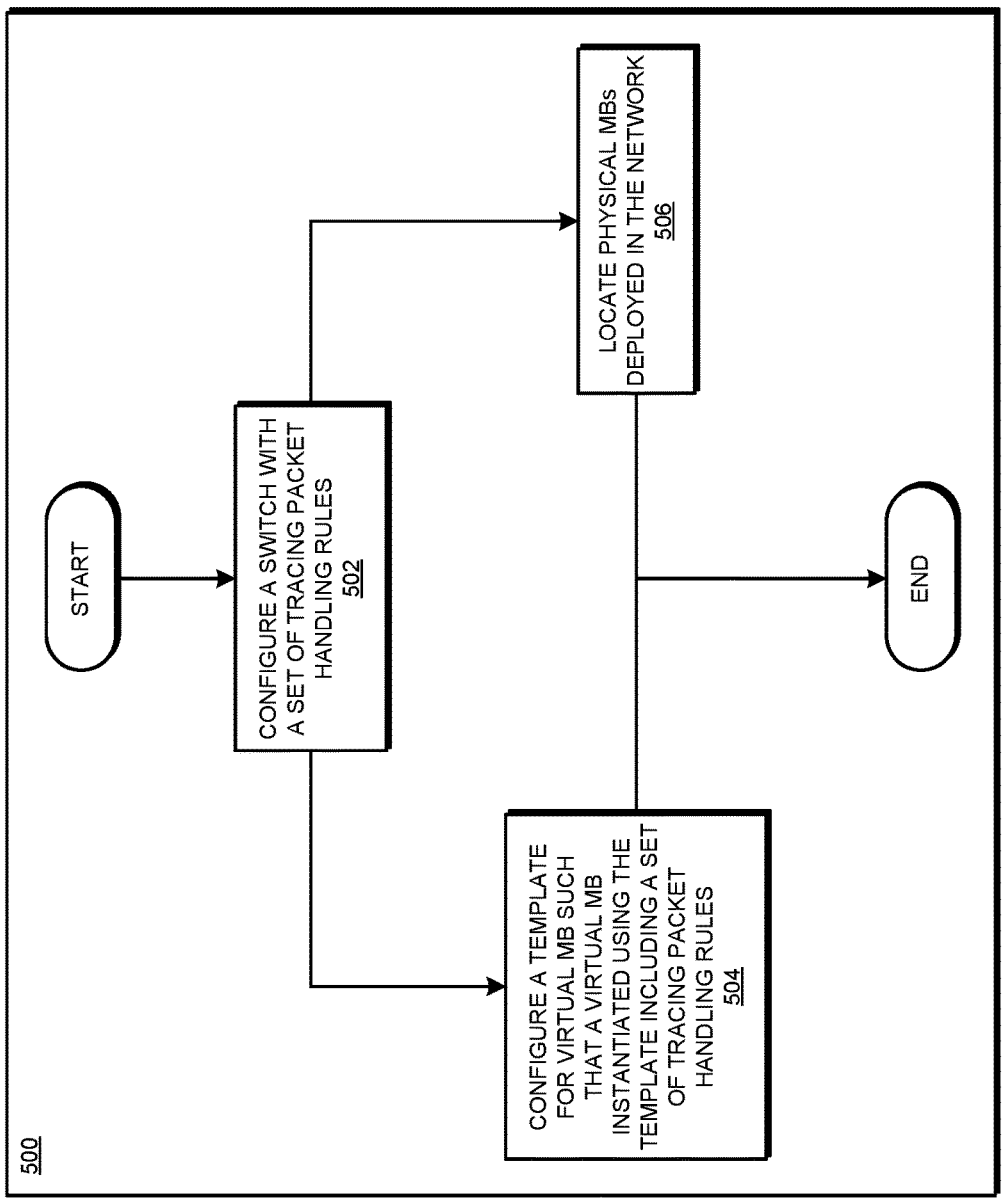
FIG. 5 depicts a flowchart of an example process for preparing switches and middleboxes for middlebox tracing in an SDN in accordance with an illustrative embodiment.

With reference to FIG. 5, this figure depicts a flowchart of an example process for preparing switches and middleboxes for middlebox tracing in an SDN in accordance with an illustrative embodiment. Process 500 can be implemented in application 302 of FIG. 3 or 402 of FIG. 4.

The application configures a switch a set of packet forwarding rules (block 502). Any number of switches can be so configured.

When application 302 implements process 500 for virtual middleboxes, the application configures a template, e.g., a configuration file, for virtual middleboxes such that a virtual middlebox instantiated using the template includes a set of tag changing rules (block 504). The application ends process 500 thereafter.

When application 402 implements process 500 for physical middleboxes, the application can optionally pre-locate the physical middleboxes as described herein (block 506). The application ends process 500 thereafter.

Figure 6:
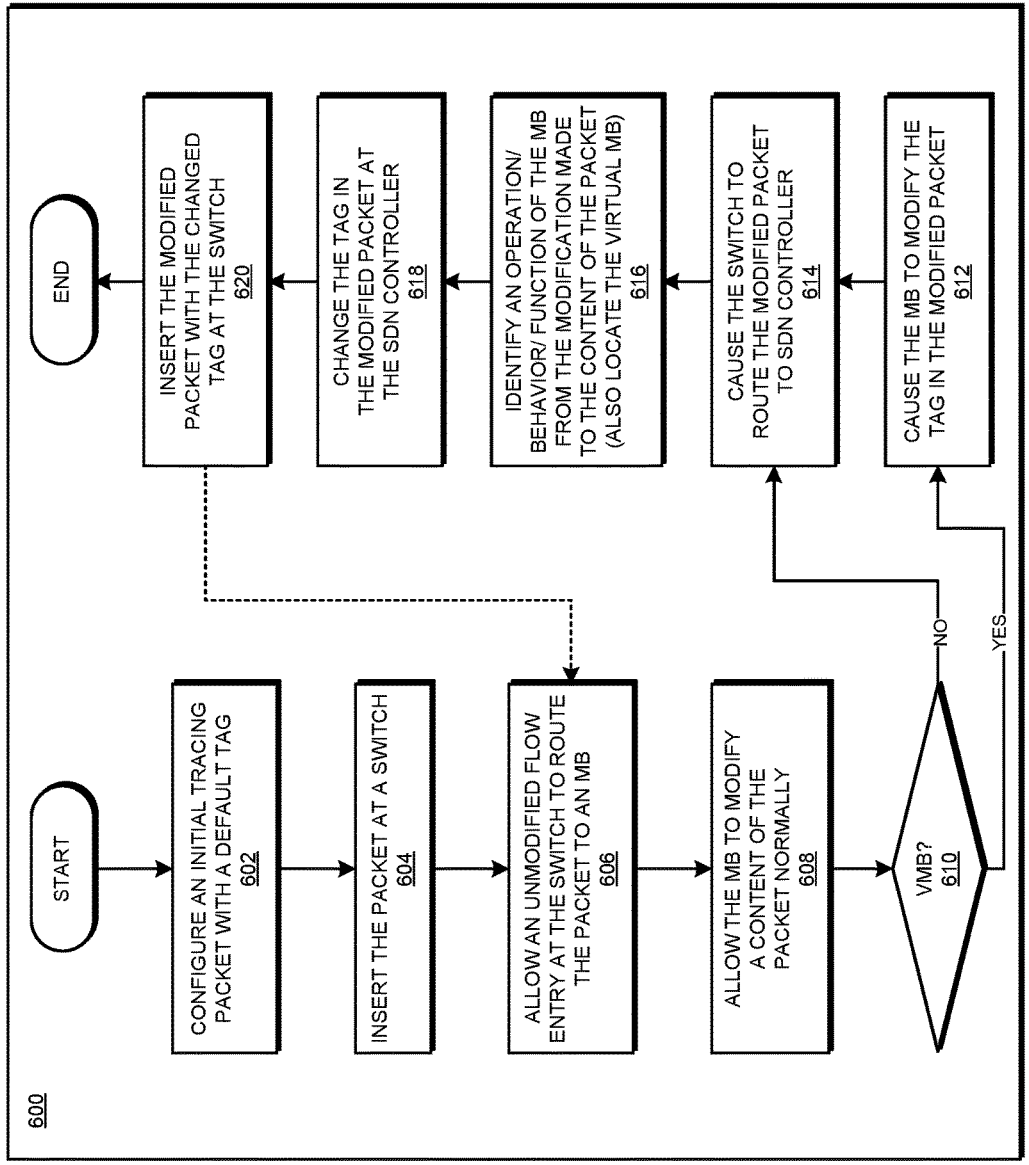
FIG. 6 depicts a flowchart of an example process for middlebox tracing in an SDN in accordance with an illustrative embodiment.

With reference to FIG. 6, this figure depicts a flowchart of an example process for middlebox tracing in an SDN in accordance with an illustrative embodiment. Process 600 can be implemented in application 302 of FIG. 3 or 402 of FIG. 4.

The application configures an initial tracing packet with a default tag value (block 602). The application inserts the tracing packet at a switch (block 604). The application allows an unmodified flow entry at the switch to route the tracing packet to a middlebox (block 606). The application allows the middlebox to modify the content of the tracing packet and create a modified packet as the middlebox normally would while performing a configured SDN function (block 608).

If the middlebox is a virtual middlebox ("Yes" path of block 610), the application causes the middlebox to modify the tag value in the modified packet (block 612) and proceeds to block 614. If the middlebox is a physical middlebox ("No" path of block 610), the application causes the switch to forward the modified packet to the improved SDN controller (block 614).

The application identifies an operation, behavior, or function of the middlebox from the modifications made to the content of the packet (block 616). In block 616, the application also locates the middlebox, e.g., a port on which the middlebox communicates with the switch.

The application changes the tag in the modified packet at the improved controller (block 618). In case of virtual middleboxes, the change resets the tag to a default value. In case of physical middleboxes, the change changes the tag value according to a controller rule.

The application reinserts the modified packet with the changed tag at the switch (block 620). The application returns to block 606 and repeats the process for as many middleboxes as may have to be detected in this manner. The application ends process 600 after block 620 when no more middleboxes are needed to be detected.

Thus, a computer implemented method, system or apparatus, and computer program product are provided in the illustrative embodiments for middlebox tracing in an SDN and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
configuring, at a software defined network (SDN) controller executing using a processor and a memory, a tracing packet with a default value in a tag field;
inserting the tracing packet from the SDN controller into the SDN at a switch in the SDN;
receiving, at the controller, from the switch, a returned packet and a port identifier, the returned packet including a modified content in a location of the tracing packet that is different from the tag field, the port identifier corresponding to a port of the switch on which the switch received the returned packet from an middlebox;

identifying a function of the middlebox by analyzing a modification applied to the modified content by the middlebox; and saving the function of the middlebox and a location of the middlebox in the SDN, the location comprising the port identifier and an identifier of the switch.

2. The method of claim 1, further comprising:
configuring, for use by the switch, a set of packet forwarding rules, a packet forwarding rule in the set of packet forwarding rules being configured to forward the returned packet from the switch to the SDN controller when the returned packet includes a value in the tag field of the packet, wherein the packet forwarding rule specifies the value.

3. The method of claim 2, further comprising:
configuring the packet forwarding rule with the port identifier, such that the packet forwarding rule causes the switch to perform the forwarding when the returned packet having the specified value arrives on a port of the switch corresponding to the port identifier.

4. The method of claim 2, further comprising:
assigning a highest execution priority to the set of packet forwarding rules at the switch such that when the switch receives any packet, the set of packet forwarding rules is executed prior to executing any other rule at the switch relative to the received packet.

5. The method of claim 1, further comprising:
allowing a flow entry at the switch to route the tracing packet to the middlebox in the SDN; and
allowing the middlebox to modify a content located in the tracing packet at a location other than the tag field of the tracing packet, wherein the middlebox modifies the content located in the tracing packet at the location other than the tag field in a manner consistent with an SDN function configured at the middlebox.

6. The method of claim 1, further comprising:
configuring a virtual middlebox template with a set of tag changing rules such that a virtual middlebox instantiated in the SDN using the virtual middlebox template includes the set of tag changing rules, wherein the middlebox is a virtual middlebox instantiated from the virtual middlebox template.

7. The method of claim 6, further comprising:
configuring the middlebox to change the default value to a modified value, wherein the modified value is determined according to a tag changing rule in the set of tag changing rules configured in the middlebox.

8. The method of claim 7, further comprising:
forming a new tracing packet using the modified content of the returned packet and the reset tag value;
resetting, at the controller, in the new tracing packet, the tag field from modified value to the default value; and
inserting the new tracing packet into the SDN.

9. The method of claim 8, wherein the inserting the new tracing packet occurs at a second switch, further comprising:
causing, at the switch, a forwarding of the new tracing packet to a second middlebox according to a service chain of middleboxes.

10. The method of claim 8, wherein the inserting the new tracing packet occurs at the switch, further comprising:
causing, at the switch, a forwarding of the new tracing packet to a second middlebox according to a service chain of middleboxes.

11. The method of claim 1, further comprising:
configuring a set of controller rules at the SDN controller;
forming, at the controller, a new tracing packet using the modified content of the returned packet;
determining according to a controller rule a new value to be placed in tag field of a new tracing packet,
inserting the new tracing packet into the SDN.

12. The method of claim 11, further comprising:
configuring a controller rule in the set of controller rules to determine the new value according to a condition, wherein the condition evaluates a switch identifier of the switch and the port identifier of a port on the switch on which the switch received the returned packet.

13. The method of claim 12, wherein the condition further evaluates a value in the tag field of the returned packet.

14. The method of claim 11, wherein the inserting the new tracing packet occurs at the switch, further comprising:
causing, at the switch, a forwarding of the new tracing packet to a second middlebox according to a service chain of middleboxes.

15. The method of claim 11, wherein the new value is the default value, and wherein the inserting the new tracing packet occurs at a second switch, further comprising:
causing, at the switch, a forwarding of the new tracing packet to a second middlebox according to a service chain of middleboxes.

16. The method of claim 11, wherein the middlebox is a physical middlebox.

17. A computer usable program product comprising a computer readable storage device including computer usable code, the computer usable code comprising:
computer usable code for configuring, at a software defined network (SDN) controller executing using a processor and a memory, a tracing packet with a default value in a tag field;
computer usable code for inserting the tracing packet from the SDN controller into the SDN at a switch in the SDN;
computer usable code for receiving, at the controller, from the switch, a returned packet and a port identifier, the returned packet including a modified content in a location of the tracing packet that is different from the tag field, the port identifier corresponding to a port of the switch on which the switch received the returned packet from an middlebox;
computer usable code for identifying a function of the middlebox by analyzing a modification applied to the modified content by the middlebox; and
computer usable code for saving the function of the middlebox and a location of the middlebox in the SDN, the location comprising the port identifier and an identifier of the switch.

18. The computer usable program product of claim 15, wherein the computer usable code is stored in a computer readable storage device in a data processing system, and wherein the computer usable code is transferred over a network from a remote data processing system.

19. The computer usable program product of claim 15, wherein the computer usable code is stored in a computer readable storage device in a server data processing system, and wherein the computer usable code is downloaded over a network to a remote data processing system for use in a computer readable storage device associated with the remote data processing system.

20. A data processing system comprising:
a storage device, wherein the storage device stores computer usable program code; and
a processor, wherein the processor executes the computer usable program code, and wherein the computer usable program code comprises:
computer usable code for configuring, at a software defined network (SDN) controller executing using a processor and a memory, a tracing packet with a default value in a tag field;
computer usable code for inserting the tracing packet from the SDN controller into the SDN at a switch in the SDN;
computer usable code for receiving, at the controller, from the switch, a returned packet and a port identifier, the returned packet including a modified content in a location of the tracing packet that is different from the tag field, the port identifier corresponding to a port of the switch on which the switch received the returned packet from an middlebox;
computer usable code for identifying a function of the middlebox by analyzing a modification applied to the modified content by the middlebox; and
computer usable code for saving the function of the middlebox and a location of the middlebox in the SDN, the location comprising the port identifier and an identifier of the switch.

* * * * *